US010838114B2

(12) United States Patent
Lee et al.

(10) Patent No.: US 10,838,114 B2
(45) Date of Patent: Nov. 17, 2020

(54) POLARIZER PROTECTING FILM, POLARIZER PLATE COMPRISING THE SAME, LIQUID CRYSTAL DISPLAY COMPRISING THE POLARIZER PLATE, AND COATING COMPOSITION FOR POLARIZER PROTECTING FILM

(71) Applicant: LG CHEM, LTD., Seoul (KR)

(72) Inventors: Han Na Lee, Daejeon (KR); Yeong Rae Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 324 days.

(21) Appl. No.: 16/080,771

(22) PCT Filed: Dec. 26, 2017

(86) PCT No.: PCT/KR2017/015483

§ 371 (c)(1),
(2) Date: Aug. 29, 2018

(87) PCT Pub. No.: WO2018/124699

PCT Pub. Date: Jul. 5, 2018

(65) Prior Publication Data

US 2019/0129071 A1 May 2, 2019

(30) Foreign Application Priority Data

Dec. 26, 2016 (KR) ........................ 10-2016-0179504

(51) Int. Cl.

| | |
|---|---|
| ***G02B 1/00*** | (2006.01) |
| ***G02B 1/14*** | (2015.01) |
| ***G02F 1/1335*** | (2006.01) |
| ***C09D 5/22*** | (2006.01) |
| ***C09D 7/61*** | (2018.01) |
| ***C09D 135/02*** | (2006.01) |
| ***C09D 133/14*** | (2006.01) |
| ***C09D 4/00*** | (2006.01) |
| ***C09D 133/08*** | (2006.01) |
| ***G02B 5/30*** | (2006.01) |

(52) U.S. Cl.

CPC ................ *G02B 1/14* (2015.01); *C09D 4/00* (2013.01); *C09D 5/22* (2013.01); *C09D 7/61* (2018.01); *C09D 133/08* (2013.01); *C09D 133/14* (2013.01); *C09D 135/02* (2013.01); *G02B 5/30* (2013.01); *G02F 1/1335* (2013.01); *G02F 1/133528* (2013.01)

(58) Field of Classification Search

CPC ........... G02B 1/14; G02B 5/30; G02F 1/1335; G02F 1/133528; C09D 133/08; C09D 5/22; C09D 7/61; C09D 135/02; C09D 133/14; C09D 4/00

USPC .......................................................... 359/507

See application file for complete search history.

(56) References Cited

U.S. PATENT DOCUMENTS

| | | | | |
|---|---|---|---|---|
| 2016/0090501 | A1 | 3/2016 | Hyung et al. | |
| 2016/0349573 | A1* | 12/2016 | Ohmuro .................. | G02B 5/26 |

FOREIGN PATENT DOCUMENTS

| | | | |
|---|---|---|---|
| CN | 104834028 | A | 8/2015 |
| CN | 105143933 | A | 12/2015 |
| CN | 105164556 | A | 12/2015 |
| EP | 0943918 | A1 | 9/1999 |
| JP | 2013028729 | A | 2/2013 |
| JP | 2014-225008 | A | 12/2014 |
| JP | 2016526174 | A | 9/2016 |
| JP | 2016529530 | A | 9/2016 |
| KR | 10-1202109 | B1 | 11/2012 |
| KR | 10-2014-0127676 | A | 11/2014 |
| KR | 10-2015-0025672 | A | 3/2015 |
| KR | 10-2015-0086663 | A | 7/2015 |
| KR | 10-2015-0093110 | A | 8/2015 |
| KR | 10-2015-0144842 | A | 12/2015 |
| WO | 99/24527 | | 5/1999 |

* cited by examiner

*Primary Examiner* — Euncha P Cherry

(74) *Attorney, Agent, or Firm* — Dentons US LLP

(57) ABSTRACT

The present disclosure relates to a polarizer protecting film, a polarizing plate including the same, a liquid crystal display including the polarizing plate, and a coating composition for polarizer protecting film. More specifically, it relates to a coating composition capable of producing a polarizer protecting film exhibiting excellent physical and optical characteristics while absorbing and emitting light in a specific wavelength range to enhance visibility of a laser pointer, a polarizer protecting film produced by using the same, a polarizing plate including the polarizer protecting film, and a liquid crystal display including the polarizing plate.

14 Claims, No Drawings

POLARIZER PROTECTING FILM, POLARIZER PLATE COMPRISING THE SAME, LIQUID CRYSTAL DISPLAY COMPRISING THE POLARIZER PLATE, AND COATING COMPOSITION FOR POLARIZER PROTECTING FILM

TECHNICAL FIELD

Cross Reference to Related Applications

This application is a National Stage Entry of International Application No. PCT/KR2017/015483 filed on Dec. 26, 2017, and claims the benefit of Korean Application No. 10-2016-0179504 on Dec. 26, 2016, all of which are hereby incorporated by reference in their entirety for all purposes as if fully set forth herein. This application claims the benefit of Korean Patent Application No. 10 2016 0179504 on Dec. 26, 2016 with the Korean Intellectual Property Office, the disclosure of which is herein incorporated by reference in its entirety.

The present disclosure relates to a polarizer protecting film, a polarizing plate including the same, a liquid crystal display including the polarizing plate, and a coating composition for a polarizer protecting film. More specifically, it relates to a coating composition capable of producing a polarizer protecting film exhibiting excellent physical and optical characteristics while absorbing and emitting light in a specific wavelength range to enhance visibility to a laser pointer, a polarizer protecting film produced by using the same, a polarizing plate including the polarizer protecting film, and a liquid crystal display including the polarizing plate.

BACKGROUND OF ART

A liquid crystal display (LCD) is one of a variety of flat panel displays which are currently widely available. Typically, an LCD is configured such that a liquid crystal layer is interposed between a thin film transistor (TFT) array substrate and a color filter substrate. When an electric field is applied to electrodes of the array substrate and the color filter substrate, liquid crystal molecules of the liquid crystal layer interposed therebetween are differently arranged, thereby displaying an image.

When a presentation is performed in a lecture, a meeting, a conference, etc., the speaker generally shows a data image with the liquid crystal display device, and performs a presentation while pointing to a screen or the like using a laser pointer on the presentation image.

However, the display device has a problem in that laser projections by the laser pointer are not visible because of the light emission characteristic. In addition, when functionalities are imparted to a surface of the display device or a display protecting panel by an antiglare layer, an antireflection layer, or the like, reflection of the laser pointer projections is also suppressed, so that the visibility of the laser pointer may be deteriorated.

Therefore, there is still a need to develop a method for improving visibility of a laser pointer in a liquid crystal display device without additional processing.

DETAILED DESCRIPTION OF THE INVENTION

Technical Problem

The present disclosure provides a coating composition for a polarizer protecting film capable of improving visibility of a laser pointer at a low cost by improving a protecting film of a lower polarizing plate among devices included in a liquid crystal display (LCD) without changing a backlight or a color filter while exhibiting excellent physical and optical characteristics, a polarizer protecting film produced by using the same, a polarizing plate including the polarizer protecting film, and a liquid crystal display including the polarizing plate.

Technical Solution

The present disclosure provides a polarizer protecting film, including a substrate, and a photocurable resin layer provided on at least one face of the substrate, wherein the photocurable resin layer includes a cured product of a photocurable binder and a dye, and a maximum absorption wavelength is 520 nm to 540 nm and a maximum excitation wavelength is 540 nm to 600 nm, or a maximum absorption wavelength is 610 nm to 660 nm and a maximum excitation wavelength is 640 nm to 680 nm.

The present disclosure also provides a polarizing plate, including:

a polarizer; and the polarizer protecting film provided on at least one face of the polarizer.

In addition, the present disclosure provides a liquid crystal display including the polarizing plate.

The present disclosure also provides a coating composition for a polarizer protecting film, including:

a binder containing a photocurable functional group; a dye including at least one selected from the group consisting of a compound having a maximum absorption wavelength of 520 nm to 540 nm and a maximum excitation wavelength of 540 nm to 600 nm, and a compound having a maximum absorption wavelength of 610 nm to 660 nm and a maximum excitation wavelength of 640 nm to 680 nm; a photopolymerization initiator; and a solvent.

Advantageous Effects

According to the polarizer protecting film, the polarizing plate including the same, the liquid crystal display, and the coating composition for the polarizer protecting film of the present disclosure, visibility of a laser pointer that is deteriorated due to a backlight of LCD can be remarkably improved.

Further, this effect can be obtained by applying the present disclosure to the lower polarizing plate of the LCD without changing a color filter or a laminated structure of the LCD, so that an excessive process change or cost increase is not required, thereby reducing a production cost.

DETAILED DESCRIPTION OF THE EMBODIMENTS

The polarizer protecting film of the present disclosure includes a substrate, and a photocurable resin layer provided on at least one face of the substrate, wherein the photocurable resin layer includes a cured product of a photocurable binder and a dye, and a maximum absorption wavelength is 520 nm to 540 nm and a maximum excitation wavelength is 540 nm to 600 nm, or a maximum absorption wavelength is 610 nm to 660 nm and a maximum excitation wavelength is 640 nm to 680 nm.

In addition, the polarizing plate of the present disclosure includes a polarizer, and the polarizer protecting film provided on at least one face of the polarizer.

In addition, the liquid crystal display of the present disclosure includes the polarizing plate.

Further, the coating composition for a polarizer protecting film of the present disclosure includes: a binder containing a photocurable functional group; a dye including at least one selected from the group consisting of a compound having a maximum absorption wavelength of 520 nm to 540 nm and a maximum excitation wavelength of 540 nm to 600 nm, and a compound having a maximum absorption wavelength of 610 nm to 660 nm and a maximum excitation wavelength of 640 nm to 680 nm; a photopolymerization initiator; and a solvent.

In this disclosure, the term 'upper side' means a side disposed so as to face a viewer when a polarizing plate is installed in a device. In addition, an 'upper part' means a direction facing a viewer when a polarizing plate is installed in a device. On the contrary, a 'lower side' or a 'lower part' means a side or direction disposed so as to face the opposite side of a viewer, when a polarizing plate is installed in a device.

In the present disclosure, the maximum absorption wavelength means a wavelength at which maximum absorption occurs in an absorption spectrum of a dye. In addition, the maximum excitation wavelength means a wavelength at which maximum emission occurs in a luminescence spectrum, in which a dye releases energy while returning from an excited state to a ground state.

Hereinafter, the polarizer protecting film, the polarizing plate including the same, the liquid crystal display, and the coating composition for a polarizer protecting film of the present disclosure will be explained in more detail.

According to an embodiment of the present disclosure, a coating composition for a polarizer protecting film including: a binder containing a photocurable functional group; a dye including at least one selected from the group consisting of a compound having a maximum absorption wavelength of 520 nm to 540 nm and a maximum excitation wavelength of 540 nm to 600 nm, and a compound having a maximum absorption wavelength of 610 nm to 660 nm and a maximum excitation wavelength of 640 nm to 680 nm; a photopolymerization initiator; and a solvent, is provided.

A polarizer has a characteristic of extracting only light vibrating in one direction from the incident light vibrating in various directions. The coating composition for a polarizer protecting film of the present disclosure is used for producing a polarizer protecting film which is used for protecting the polarizer from the outside and is used on at least one side of the polarizer, and is preferably used as a lower protecting film of the polarizer.

Generally, a substrate made of polyester such as polyethylene terephthalate (PET), polyethylene such as ethylene vinyl acetate (EVA), a cyclic olefin polymer (COP), a cyclic olefin copolymer (COC), polyacrylate (PAC), polycarbonate (PC), polyethylene (PE), polymethylmethacrylate (PMMA), polyetheretherketone (PEEK), polyethylene naphthalate (PEN), polyetherimide (PEI), polyimide (PI), methyl methacrylate (MMA), a fluorine resin, or triacetylcellulose (TAC) may be used for the polarizer protecting film.

Among these substrates, particularly, triacetylcellulose (TAC) film is widely used due to its excellent optical properties.

The present disclosure is to improve the polarizer, especially the upper polarizer, among the components included in an LCD, without changing a basic structure of a backlight, a color filter, or the LCD, thereby improving visibility of a laser pointer at low cost and maintaining the existing physical and optical properties.

Therefore, an embodiment of the present disclosure provides a coating composition which can be coated and UV-cured on a substrate to form a photocurable resin layer, and laminated on one side of a polarizer to be used as a polarizer protecting film. The polarizer protecting film formed using the coating composition of the present disclosure exhibits light absorption and luminescence characteristics depending on a wavelength region, and can contribute to enhancement of visibility of a laser pointer.

Generally, in the case of a composition containing a dye, optical characteristics of the dye are modified in the curing process due to ultraviolet light, resulting in a problem that optical characteristics of a photocurable resin layer and a film containing the same are deteriorated. However, in the present disclosure, there is little or no change in transmittance before and after ultraviolet curing, which is advantageous for forming a UV curable coating layer.

In addition, the film exhibits excellent physical properties such as scratch resistance and hardness, thereby effectively protecting the lower polarizing plate. Thus, it can be applied to a polarizing plate for a display which becomes flatter and larger.

The coating composition for a polarizer protecting film of the present disclosure includes: a binder containing a photocurable functional group; a dye including at least one selected from the group consisting of a compound having a maximum absorption wavelength of 520 nm to 540 nm and a maximum excitation wavelength of 540 nm to 600 nm, and a compound having a maximum absorption wavelength of 610 nm to 660 nm and a maximum excitation wavelength of 640 nm to 680 nm; a photopolymerization initiator; and a solvent.

The binder containing the photocurable functional group is not particularly limited as long as it is a compound containing an unsaturated functional group capable of causing a polymerization reaction by ultraviolet light. For example, the binder may be a compound containing a (meth)acrylate group, an allyl group, an acryloyl group, or a vinyl group as the photocurable functional group. According to one embodiment of the present disclosure, the binder containing the photocurable functional group includes at least one selected from the group consisting of a polyfunctional acrylate-based monomer, a polyfunctional acrylate-based oligomer, and a polyfunctional acrylate-based elastic polymer.

In this disclosure, the acrylate-based includes not only acrylates but also methacrylates, or derivatives in which substituents are introduced into the acrylates or methacrylates.

The polyfunctional acrylate-based monomer includes two or more acrylate-based functional groups and has a weight average molecular weight of less than 1000 g/mol. More specifically, it may be hexanediol diacrylate (HDDA), tripropylene glycol diacrylate (TPGDA), ethylene glycol diacrylate (EGDA), trimethylolpropane triacrylate (TMPTA), tri methylolpropaneethoxy triacrylate (TMPEOTA), glycerin propoxylated triacrylate (GPTA), pentaerythritol tri(tetra)acrylate (PETA), dipentaerythritol hexaacrylate (DPHA), and the like, but it is not limited thereto. The polyfunctional acrylate-based monomer is cross-linked within itself, or with the polyfunctional acrylate-based oligomer and the polyfunctional acrylate-based elastic polymer to give the protecting film constant pencil strength and abrasion resistance.

The polyfunctional acrylate-based monomer may be used alone or in combination with different monomers.

The polyfunctional acrylate-based oligomer includes two or more acrylate-based functional groups, and may have a weight average molecular weight of about 1000 to about 10,000 g/mol, about 1000 to about 5000 g/mol, or about 1000 to about 3000 g/mol.

According to an embodiment of the present disclosure, the polyfunctional acrylate-based oligomer may have elongation of about 5 to about 200%, about 5 to about 100%, or about 10 to about 50%, as measured in accordance with ASTM D638. When the elongation of the acrylate-based oligomer is within the above range, it is possible to exhibit more flexibility and elasticity without deteriorating the mechanical properties. The polyfunctional acrylate-based oligomer satisfying the above-mentioned elongation range may be superior in flexibility and elasticity and form a cured resin with the polyfunctional acrylate-based monomer and the polyfunctional acrylate-based elastic polymer, and can provide sufficient flexibility and curling property to the film including the same.

In addition, the polyfunctional acrylate-based oligomer may be an acrylate-based oligomer modified with one or more of urethane, ethylene oxide, propylene oxide, or caprolactone. When the modified polyfunctional acrylate-based oligomer is used, more flexibility can be given to the polyfunctional acrylate-based oligomer by the modification, and the curling property and the flexibility of the film can be improved.

The acrylate-based oligomer may be used alone or in combination with different oligomers.

The polyfunctional acrylate-based elastic polymer is excellent in flexibility and elasticity, and is a polymer having 2 or more acrylate functional groups. It may have a weight average molecular weight of about 100,000 to about 800,000 g/mol, about 150,000 to about 700,000 g/mol, or about 180,000 to about 650,000 g/mol.

The protecting film formed using the coating composition containing the polyfunctional acrylate-based elastic polymer may exhibit high elasticity or flexibility while having excellent mechanical properties, and can minimize the occurrence of curl or cracks.

According to an embodiment of the present disclosure, the polyfunctional acrylate-based elastic polymer may have elongation of about 5 to about 200%, about 5 to about 100%, or about 10 to about 50%, as measured in accordance with ASTM D638. When the polyfunctional acrylate-based elastic polymer has the elongation within the above range, it can show excellent flexibility and elasticity without a decrease in mechanical properties.

An example of the polyfunctional acrylate-based elastic polymer may be a polyrotaxane.

The polyrotaxane is a polymer composed of dumbbell-shaped molecules and cyclic compounds (macrocycles), which are structurally interlocked. The dumbbell-shaped molecule includes a certain linear molecule and stopper groups placed at both ends of the linear molecule and the linear molecule passes through the inside of the macrocycle, and the macrocycle can move along the linear molecule and is prevented by the stopper groups from dissociation.

According to an embodiment of the present disclosure, the polyrotaxane may include a rotaxane compound including a macrocycle connected with a lactone compound with an acrylate moiety introduced to the end thereof, a linear compound passing through the macrocycle, and the stopper groups placed at both ends of the linear compound so as to prevent the macrocycle from dissociation.

No particular limitations are imposed on the macrocycle as long as it is large enough to pass or surround the linear molecule. The macrocycle may include a functional group such as a hydroxide group, an amino group, a carboxyl group, a thiol group, an aldehyde group, or the like, which can react with other polymers or compounds. Specific examples of the macrocycle may be α-cyclodextrin, β-cyclodextrin, γ-cyclodextrin, and mixtures thereof.

Furthermore, any compound of a linear form having a regular molecular weight or more may be used as the linear molecule without restriction, and polyalkylene compounds or polylactone compounds may be used. Specifically, polyoxyalkylene compounds including C1-8 oxyalkylene repeating units or polylactone compounds including C3-10 lactone repeating units may be used.

In addition, the linear molecule may have a weight average molecular weight of about 1000 to about 50,000 g/mol. When the weight average molecular weight of the linear molecule is too small, mechanical properties or self-healing ability of the protecting film formed using the same may be insufficient. When the weight average molecular weight is too large, compatibility of the protecting film may be decreased, or appearance characteristics or uniformity of the material may be greatly deteriorated.

Meanwhile, the stopper group may be appropriately adjusted depending on the characteristics of the polyrotaxane to be prepared. For example, the stopper group may be at least one selected from the group consisting of a dinitrophenyl group, a cyclodextrin group, an adamantane group, a trityl group, a fluorescein group, and a pyrene group.

Another example of the polyfunctional acrylate-based elastic polymer may be urethane-based acrylate polymer. The urethane-based acrylate polymer has a form in which a urethane-based acrylate oligomer is side-linked to the main chain of the acrylic polymer.

Next, the dye included in the coating composition for a polarizer protecting film of the present disclosure is characterized in that the dye has a maximum absorption wavelength of about 520 nm to about 540 nm and a maximum excitation wavelength of about 540 nm to about 600 nm, preferably a maximum absorption wavelength of about 530 nm to about 540 nm and a maximum excitation wavelength of about 550 nm to about 570 nm; or a maximum absorption wavelength of about 610 nm to about 660 nm and a maximum excitation wavelength of about 640 nm to about 680 nm, preferably a maximum absorption wavelength of about 620 nm to about 640 nm and a maximum excitation wavelength of about 640 nm to about 660 nm.

The dye satisfying the above-mentioned conditions absorbs unnecessary light of the spectrum band which can reduce visibility of the laser pointer by causing a color mixing problem with light incident from a backlight such as a CCFL, an LED, etc. of the LCD, especially with a green laser pointer or a red laser pointer. Therefore, a display equipped with the polarizer protecting film prepared using the coating composition containing the dye and a polarizing plate can have a significantly improved visibility when a laser pointer is irradiated on the surface thereof. This will be described in more detail later in the description of the polarizer protecting film and the polarizing plate.

Specific examples of the dye satisfying these conditions include a cyanine derivative compound, a boron-dipyrromethene (BODIPY) derivative compound, a rhodamine derivative compound, and a mixture thereof, but the present disclosure is not limited thereto.

According to an embodiment of the present disclosure, the dye may be included in an amount of about 0.1 to about 5 parts by weight, preferably about 0.1 to about 3 parts by weight, based on 100 parts by weight of the binder containing a photocurable functional group. When too little of the dye is included, the effect of improving the visibility may be insufficient because of insufficient light absorption effect. When too much of the dye is included, the color reproducibility and luminance may be lowered and other physical properties of the coating composition may be deteriorated. Therefore, it is preferable that the dye is included within the above weight ratio.

The photopolymerization initiator included in the coating composition of the present disclosure may be 1-hydroxy-cyclohexyl-phenyl ketone, 2-hydroxy-2-methyl-1-phenyl-1-propanone, 2-hydroxy-1-[4-(2-hydroxyethoxy) phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphosphine oxide, or the like, but it is not limited to or by them. Furthermore, as products currently sold, Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, and the like may be used. The photopolymerization initiator may be used alone or in combination with different initiators.

According to an embodiment of the present disclosure, the content of the photopolymerization initiator is not particularly limited, but the photopolymerization initiator may be included in an amount of about 0.1 to about 10 parts by weight, preferably about 0.1 to about 5 parts by weight, based on 100 parts by weight of the binder containing a photocurable functional group in order to effectively carry out the photopolymerization without inhibiting the properties of the entire coating composition.

As the organic solvent included in the coating composition of the present disclosure, an alcohol solvent such as methanol, ethanol, isopropyl alcohol, and butanol; an alkoxy alcohol solvent such as 2-methoxyethanol, 2-ethoxyethanol, and 1-methoxy-2-propanol; a ketone solvent such as acetone, methyl ethyl ketone, methyl isobutyl ketone, methyl propyl ketone, and cyclohexanone; an ether solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether, and diethylene glycol-2-ethylhexyl ether; and an aromatic solvent such as benzene, toluene, and xylene may be used alone or in combination thereof.

According to an embodiment of the present disclosure, the content of the organic solvent is not particularly limited, because it can be variously modified within the range in that the properties of the coating composition are not deteriorated. The organic solvent may be included in an amount of about 50 to about 200 parts by weight, preferably about 100 to about 200 parts by weight, based on 100 parts by weight of the binder containing the photocurable functional group in order to have appropriate fluidity and applicability.

According to an embodiment of the present disclosure, the coating composition may exhibit an antiglare property by further including an organic fine particle or an inorganic fine particle. When the coating composition includes the organic fine particle or the inorganic fine particle, the cured resin layer using the same may have a characteristic of light scattering and exhibit the antiglare property.

The particle diameter of the organic or inorganic fine particle may be about 1 μm or more in terms of optimizing the scattering effect of light, and 10 μm or less in terms of proper haze and coating thickness. More specifically, the particle diameter of the organic or inorganic fine particle may be about 1 to about 10 μm, preferably about 1 to about 5 μm, more preferably about 1 to about 3 μm. When the particle diameter of the organic or inorganic fine particle is less than 1 μm, the effect of preventing glare due to light scattering may be insignificant. When the particle diameter exceeds 10 μm, it is necessary to increase the coating thickness in order to have an appropriate level of haze, but cracks may occur in this case.

In addition, the volume average particle diameter of the organic or inorganic fine particle may be about 2 to about 10 μm, preferably about 2 to about 5 μm, and more preferably about 2 to about 3 μm.

The organic or inorganic fine particle is not particularly limited as long as it is used for forming an antiglare film.

For example, the organic fine particle may be at least one selected from organic fine particles consisting of an acrylic-based resin, a styrene-based resin, an epoxy resin, and a nylon resin.

More specifically, the organic fine particle may be at least one selected from the group consisting of methyl(meth)acrylate, ethyl(meth)acrylate, propyl(meth)acrylate, n-butyl (meth)acrylate, isobutyl(meth)acrylate, t-butyl(meth)acrylate, 2-ethylhexyl(meth)acrylate, n-octyl(meth)acrylate, lauryl(meth)acrylate, stearyl(meth)acrylate, 2-hydroxyethyl (meth)acrylate, polyethylene glycol(meth)acrylate, methoxypolyethylene glycol(meth)acrylate, glycidyl(meth) acrylate, dimethylaminoethyl(meth)acrylate, diethylaminoethyl(meth)acrylate, styrene, p-methylstyrene, m-methylstyrene, p-ethylstyrene, m-ethylstyrene, p-chlorostyrene, m-chlorostyrene, p-chloromethylstyrene, m-chloromethylstyrene, styrenesulfonic acid, p-t-butoxystyrene, m-t-butoxystyrene, vinyl acetate, vinyl propionate, vinyl butyrate, vinyl ether, allyl butyl ether, allyl glycidyl ether, (meth) acrylic acid, maleic acid, unsaturated carboxylic acid, alkyl (meth)acrylamide, (meth)acrylonitrile, and (meth)acrylate, but is not limited thereto.

In addition, the organic fine particle may be at least one selected from the group consisting of polystyrene, polymethyl methacrylate, polymethyl acrylate, polyacrylate, polyacrylate-co-styrene, polymethyl acrylate-co-styrene, polymethyl methacrylate-co-styrene, polycarbonate, polyvinyl chloride, polybutylene terephthalate, polyethylene terephthalate, polyamide resin, polyimide resin, polysulfone, polyphenylene oxide, polyacetal, epoxy resin, phenol resin, silicone resin, melamine resin, benzoguanamine, polydivinylbenzene, polydivinylbenzene-co-styrene, polydivinylbenzene-co-acrylate, polydiallyl phthalate, and triallyl isocyanurate polymer, or copolymers of two or more thereof, but is not limited thereto.

In addition, the inorganic fine particle may be at least one selected from the group consisting of silicon oxide, titanium dioxide, indium oxide, tin oxide, zirconium oxide, and zinc oxide, but is not limited thereto.

The total content of the organic and inorganic fine particle may be about 1 to about 20 parts by weight, preferably about 5 to about 15 parts by weight, more preferably about 6 to about 10 parts by weight, based on 100 parts by weight of the binder containing the photocurable functional group. When the total content of the organic and inorganic fine particle is less than 1 part by weight based on 100 parts by weight of the binder containing the photocurable functional group, the haze value may be insufficient due to internal scattering. When the total content of the organic and inorganic fine particle exceeds 20 parts by weight, the coating property may become poor due to high viscosity of the composition, and the haze value may become too high due to the internal scattering, thereby reducing the contrast ratio.

According to an embodiment of the present disclosure, the organic or inorganic fine particle may have a difference in refractive index of about 0.005 to about 0.1, preferably about 0.01 to about 0.07, more preferably about 0.015 to about 0.05, with respect to the photocurable resin of the binder containing the photocurable functional group. When the difference in refractive index is less than 0.005, it may be difficult to obtain an appropriate haze value required for preventing glare. When the difference in refractive index is more than 0.1, the internal scattering may increase and the haze value may also increase, but the contrast ratio may be reduced.

Furthermore, the coating composition of the present disclosure may further include additives such as a surfactant, an antioxidant, a UV stabilizer, a leveling agent, and an antifouling agent which are commonly used in the art. The content is not particularly limited, because it can be variously modified within the range in which the properties of the composition are not deteriorated. For example, the additives may be included in an amount of about 0.1 to about 10 parts by weight, based on 100 parts by weight of the entire composition.

According to an embodiment of the present disclosure, the photocurable resin layer formed using the coating composition may have a thickness of about 1 μm or more, for example, about 1 to about 20 μm, about 2 to about 10 μm, or about 2 to about 5 μm after drying and curing, and may exhibit appropriate optical and physical properties within the thickness range.

Another embodiment of the present disclosure provides a polarizer protecting film including: a substrate; and a photocurable resin layer provided on at least one face of the substrate and formed using the above-described coating composition for a polarizer protecting film, wherein a maximum absorption wavelength is 520 nm to 540 nm and a maximum excitation wavelength is 540 nm to 600 nm, or a maximum absorption wavelength is 610 nm to 660 nm and a maximum excitation wavelength is 640 nm to 680 nm.

The polarizer protecting film of the present disclosure can be formed by applying the coating composition for a polarizer protecting film including a binder containing a photocurable functional group, a dye including at least one selected from the group consisting of a compound having a maximum absorption wavelength of 520 nm to 540 nm and a maximum excitation wavelength of 540 nm to 600 nm, and a compound having a maximum absorption wavelength of 610 nm to 660 nm and a maximum excitation wavelength of 640 nm to 680 nm, a photopolymerization initiator, and a solvent, and optionally an organic fine particle or an inorganic fine particle, to a transparent plastic substrate and photocuring it.

The detailed description of the coating composition, and the detailed description and specific examples of the binder containing the photocurable functional group, the dye including at least one selected from the group consisting of a compound having a maximum absorption wavelength of 520 nm to 540 nm and a maximum excitation wavelength of 540 nm to 600 nm, and a compound having a maximum absorption wavelength of 610 nm to 660 nm and a maximum excitation wavelength of 640 nm to 680 nm, the photopolymerization initiator, the solvent, the organic or inorganic fine particle, and other components that may be included are as described above.

The method of coating the coating composition is not particularly limited, as long as it can be used in the related art. For example, a bar-coating method, a knife-coating method, a roll-coating method, a blade-coating method, a die-coating method, a microgravure-coating method, a comma-coating method, a slot die-coating method, a lip-coating method, or a solution casting method may be used.

Subsequently, the photocuring reaction may be carried out by exposing the coated coating composition to ultraviolet light so as to form a protecting film. Before the ultraviolet light irradiation, processes for leveling the coated surface of the coating composition and drying the same for evaporating the solvent included in the composition may be further carried out.

The irradiation dose of ultraviolet light, for example, may be about 20 to about 600 $mJ/cm^2$. The source of the UV irradiation is not particularly limited, as long as it can be used in the related art. For example, a high pressure mercury lamp, a metal halide lamp, a black light fluorescent lamp, and the like may be used.

As described above, the polarizer protecting film of the present disclosure exhibits different light transmittance depending on a wavelength band by including the dye including at least one selected from the group consisting of a compound having a maximum absorption wavelength of 520 nm to 540 nm and a maximum excitation wavelength of 540 nm to 600 nm, and a compound having a maximum absorption wavelength of 610 nm to 660 nm and a maximum excitation wavelength of 640 nm to 680 nm.

For example, the polarizer protecting film of the present disclosure has average light transmittance of less than about 85%, preferably less than about 81%, at a wavelength of 520 nm to 540 nm, or 610 nm to 660 nm, which is the region where the maximum absorption wavelength appears. Further, it has average transmittance of about 90% or more, for example, at a wavelength of 400 nm to 500 nm which is the remaining region. Therefore, the difference in the average transmittance between the region where the maximum absorption wavelength appears and the remaining region may be 10% or more.

Due to the difference in light transmittance depending on a wavelength band and the maximum absorption wavelength characteristic, the film can absorb light in a certain wavelength band which overlaps with a laser pointer among light incident from a backlight in a liquid crystal display, thereby reducing intensity. Therefore, it is possible to provide a polarizing plate and LCD having high color reproducibility while enhancing the visibility of the laser pointer.

In addition, according to an embodiment of the present disclosure, the polarizer protecting film of the present disclosure may have a relative luminance value measured by the following Formula 1 of about 1.5 or more, preferably about 1.6 or more. The upper limit is not significant, but may be about 1.5 to about 2.5, or about 1.6 to about 2.1.

$$B/A \quad \text{[Formula 1]}$$

In Formula 1,

A is a luminance value measured when a 535 nm or 635 nm laser is irradiated in 60° from a normal direction, after the polarizer protecting film not containing the dye is placed on a backlight side, and B is a luminance value measured when a 535 nm or 635 nm laser is irradiated in 60° from a normal direction, after the polarizer protecting film containing the dye is placed on a backlight side.

As described above, the photocurable resin layer and the polarizer protecting film including the same of the present disclosure absorb light in a specific wavelength band generally used for a laser pointer or the like among light emitted from a backlight, unlike the case of using a general UV curable coating layer. Therefore, when the laser in the corresponding wavelength band is irradiated onto the surface, the luminance increases by about 50% or more, preferably by about 60% or more, compared with the luminance before the irradiation, which can remarkably improve the visibility of the laser pointer.

In the polarizer protecting film of the present disclosure, the substrate on which the photocurable resin layer is formed may be a transparent plastic resin, which is usually used as a polarizer protecting film. More specifically, polyester such as polyethylene terephthalate (PET), polyethylene such as ethylene vinyl acetate (EVA), a cyclic olefin polymer (COP), a cyclic olefin copolymer (COC), polyacrylate (PAC), polycarbonate (PC), polyethylene (PE), polymethylmethacrylate (PMMA), polyetheretherketone (PEEK), polyethylene naphthalate (PEN), polyetherimide (PEI), polyimide (PI), methyl methacrylate (MMA), a fluorine resin, or triacetylcellulose (TAC) may be used.

Preferably, the substrate may be a film including triacetylcellulose (TAC).

The thickness of the substrate is not particularly limited, but a substrate having a thickness of about 20 to about 100 μm, or about 20 to about 60 μm, which can satisfy the hardness and other physical properties of the polarizing plate, may be used.

The polarizer protecting film of the present disclosure may have pencil hardness of HB or higher, 1H or higher, or 2H or higher, under a load of 500 g.

In addition, the film may exhibit abrasion resistance, that is, it may not have any scratches after moving the same 10 times back and forth in a friction tester with #0 steel wool under a load of 200 g, 300 g, or 400 g.

Another embodiment of the present disclosure provides a polarizing plate including a polarizer, and the above-mentioned polarizer protecting film provided on at least one face of the polarizer.

A polarizer has a characteristic of extracting only light vibrating in one direction from the incident light vibrating in various directions. This characteristic may be achieved by stretching polyvinyl alcohol (PVA) having iodine absorbed thereto under strong tension. For example, more specifically, a polarizer may be formed by swelling a PVA film in an aqueous solution, dyeing the swollen PVA film with a dichroic material to impart polarization performance to the film, stretching the dyed PVA film to arrange the dichroic material parallel to a stretch direction, and correcting the color of the stretched PVA film. However, the polarizing plate of the present disclosure is not limited thereto.

According to an embodiment of the present disclosure, the protecting film may be laminated on both faces of the polarizer.

According to another embodiment of the present disclosure, the polarizer protecting film may be laminated on just one face of the polarizer, and any other general film such as TAC which is generally used to protect the polarizer may be laminated on the other face of the same.

Herein, the polarizing plate of the present disclosure may be used as an upper polarizing plate of the LCD, and the polarizer protecting film may be disposed at the uppermost part in the laminated structure of the LCD.

As described above, since the polarizing plate of the present disclosure has the transmittance characteristic depending on a wavelength of the polarizer protecting film, it can reduce the visibility degradation of the laser pointer caused by spectral characteristics of the backlight in an LCD.

The polarizer and the polarizer protecting film may be adhered by lamination using an adhesive and the like. Adhesives are not particularly limited, as long as they are known in the art. For example, an aqueous adhesive, a one-component or two-component polyvinyl alcohol (PVA) adhesive, a polyurethane adhesive, an epoxy adhesive, a styrene butadiene rubber adhesive (SBR adhesive), or a hot melt type of adhesive may be used, but it is not limited thereto.

When the polarizer protecting film of the present disclosure is laminated and adhered to the polarizer, it is preferable that the substrate surface on which the photocurable resin layer is not formed is adhered to the polarizer, and the photocurable resin layer is laminated so as to be positioned outside the polarizing plate.

The polarizing plate including the protecting film of the present disclosure was explained to be applicable to the LCD as an example, but is not limited thereto, and can be applied in various fields. For example, it may be used for mobile communication handsets, smart phones, other mobile devices, display devices, electronic blackboards, outdoor billboards, and various display parts. According to the present disclosure, the polarizing plate may be a polarizing plate for TN (Twisted Nematic) or STN (Super Twisted Nematic) liquid crystals, a polarizing plate for horizontal alignment modes such as IPS (In-Plane Switching), Super-IPS, FFS (Fringe Field Switching), etc., or a polarizing plate for vertical alignment modes.

Another embodiment of the present disclosure provides a liquid crystal display including the above-mentioned polarizing plate.

For example, the liquid crystal display may include a backlight unit, a prism sheet provided on the backlight unit, and the polarizing plate provided on the prism sheet. Specifically, it may be preferable that the polarizing plate according to the embodiment of the present disclosure is used as an upper polarizing plate of a liquid crystal display device, and the photocurable resin layer is disposed on the uppermost side of the polarizing plate so as to face viewers directly.

Hereinafter, the function and effect of the present invention will be described in more detail through specific examples of the present invention. However, these examples are for illustrative purposes only, and the invention is not intended to be limited by these examples.

EXAMPLES

Preparation of a Coating Composition for a Polarizer Protecting Film and a Polarizer Protecting Film Example 1

A composition was prepared by mixing 50 g of pentaerythritol tri(tetra) acrylate (PETA), 50 g of 6-functional urethane acrylate (product name: UA-306l), 0.25 g of a fluorescent dye having a maximum absorption wavelength of 532 nm, 5 g of a photopolymerization initiator (product name: Irgacure 184), and 100 g of solvent MEK, and coated on a TAC film having a thickness of 60 μm.

This was dried at 60° C. for 2 minutes and irradiated with 200 mj/cm$^2$ of UV using a mercury lamp to form a photocurable resin layer having an average dry thickness of 5 μm to prepare a polarizer protecting film.

Example 2

A composition was prepared by mixing 50 g of pentaerythritol tri(tetra) acrylate (PETA), 50 g of 6-functional urethane acrylate (product name: UA-306I), 0.25 g of a fluorescent dye having a maximum absorption wavelength of 532 nm, 2 g of precipitated silica (OK-607, manufactured by Evonik), 5 g of a photopolymerization initiator (product name: Irgacure 184), and 100 g of solvent MEK, and coated on a TAC film having a thickness of 60 μm.

This was dried at 60° C. for 2 minutes and irradiated with 200 mj/cm$^2$ of UV using a mercury lamp to form a photocurable resin layer having an average dry thickness of 5 μm to prepare a polarizer protecting film.

Example 3

A polarizer protecting film was prepared according to the same method as in Example 1, except that 0.25 g of a fluorescent dye having a maximum absorption wavelength of 633 nm was used instead of the dye having a maximum absorption wavelength of 532 nm.

Example 4

Separately, a hard-coating composition was prepared by mixing 50 g of pentaerythritol tri(tetra) acrylate (PETA), 50 g of 6-functional urethane acrylate (product name: UA-306I), 5 g of a photopolymerization initiator (product name: Irgacure 184), and 100 g of solvent MEK.

In the polarizer protecting film prepared in Example 1, the hard-coating composition was coated on the photocurable resin layer, dried at 60° C. for 2 minutes, and then irradiated with 200 mj/cm$^2$ of UV to form a hard-coating layer having an average dry thickness of 5 μm to prepare a polarizer protecting film.

Comparative Examples 1 and 2

A polarizer protecting film was prepared according to the same method as in Examples 1 and 2, except that the fluorescent dye was not used.

Comparative Example 5

A polarizer protecting film was prepared according to the same method as in Example 1, except that 0.25 g of a dye having a maximum absorption wavelength of 497 nm was used instead of the dye having a maximum absorption wavelength of 532 nm.

Preparation of a Polarizing Plate

After laminating and adhering the film prepared in examples and comparative examples on a PVA film by using an aqueous adhesive so that the thickness of the adhesive layer was about 100 nm, TAC having a thickness of 60 μm was laminated on the other face of the PVA according to the same method above to prepare a polarizing plate.

Experimental Examples

<Measuring Methods>

The properties of the films of the examples and comparative examples were measured by the following methods.

1) Light Transmittance and Maximum Absorption Wavelength

Light transmittance at a wavelength of 300 nm to 800 nm was measured using a UV-VIS-NIR spectrometer (Solidspec-3700, manufactured by SHIMADZU) in an integrating sphere type.

2) Scratch Resistance

The surface of the resin layer of the films was rubbed 10 times back and forth with #0 steel wool under different loads, and the maximum load at which no scratches were observed was determined.

3) Pencil Hardness

Pencil hardness was measured using a pencil hardness tester (precision tester, manufactured by Chungbuk Tech) under a load of 500 g. Changes of the surface of the resin layer were observed, after the resin layer was scratched while keeping an angle of 45 degrees, using standard pencils (Mitsubishi) from 6B to 9H in accordance with ASTM 3363-74. An average value after 5 measurements was recorded for each experiment.

4) Relative Luminance (A) The polarizer protecting film of the comparative examples not containing the dye was placed on the upper side of the liquid crystal monitor, and the luminance value was measured by irradiating a 535 nm or 650 nm laser in 60° from the normal direction.

(B) The polarizer protecting film of the examples containing the dye was placed on the upper side of the liquid crystal monitor, and the luminance value was measured by irradiating a 535 nm or 650 nm laser in 60° from the normal direction.

Then, the A and B values in each of the examples and comparative examples were matched to calculate the relative luminance value.

5) Visibility

The polarizer protecting films of the examples and comparative examples were placed on the upper side of the liquid crystal monitor, and a laser pointer with a 535 nm or 650 nm laser was irradiated in 60° from the normal direction. The visibility was evaluated by an evaluation team of 5 persons. When 5 persons evaluated the visibility as good, it was recorded as ◎. When 3 or 4 persons evaluated the visibility as good, it was recorded as ○, and when 2 or fewer persons evaluated the visibility as good, it was recorded as X.

The results of the measurements are listed in the following Table 1.

TABLE 1

| | Max. absorption wavelength (nm) | Max. excitation wavelength (nm) | Average light transmittance (400 nm~500 nm, %) | Average light transmittance (520 nm~540 nm, %) | Average light transmittance (620 nm~640 nm, %) | B/A | Visibility |
|---|---|---|---|---|---|---|---|
| Ex. 1 | 532 | 553 | 90.1 | 80.1 | 91 | 1.8 (at 535 nm, vs Comp. Ex. 1) | ◎ (at 535 nm) |

TABLE 1-continued

| | Max. absorption wavelength (nm) | Max. excitation wavelength (nm) | Average light transmittance (400 nm~500 nm, %) | Average light transmittance (520 nm~540 nm, %) | Average light transmittance (620 nm~640 nm, %) | B/A | Visibility |
|---|---|---|---|---|---|---|---|
| Ex. 2 | 532 | 554 | 90.2 | 80.2 | 91.2 | 2.0 (at 535 nm, vs Comp. Ex. 2) | ◎ (at 535 nm) |
| Ex. 3 | 633 | 650 | 90.5 | 91.0 | 80.5 | 1.6 (at 650 nm, vs Comp. Ex. 1) | ○ (at 650 nm) |
| Ex. 4 | 532 | 553 | 90.1 | 80.1 | 91.1 | 1.8 (at 535 nm,v s Comp. Ex. 1) | ◎ (at 535 nm) |
| Comp. Ex. 1 | — | — | 90.5 | 91.2 | 91.1 | — | X (at 535 nm) |
| Comp. Ex. 2 | — | — | 90.3 | 91.1 | 91.0 | — | X (at 535 nm) |
| Comp. Ex. 3 | 497 | — | 81 | 91.4 | 91.2 | — | X (at 535 nm) |

As shown in Table 1, the polarizer protecting films according to the examples of the present disclosure have average light transmittance of less than about 85%, preferably about less than 81% at a wavelength of 520 nm to 540 nm or 610 nm to 660 nm, depending on the contained dye. Further, they have average transmittance of about 90% or more, for example, at a wavelength of 400 nm to 500 nm which is the remaining region. Therefore, the difference in the average transmittance between the region where the maximum absorption wavelength appears and the remaining region was 10% or more.

In addition, all have relative luminance of about 1.6 or more, which is increased by about 60% or more, preferably about 100%, compared with the comparative examples, in the wavelength range usually used for the laser pointer. As a result, it can be confirmed that the visibility of the laser pointer is remarkably improved.

In addition, the polarizer protecting films according to the examples of the present disclosure have scratch resistance of 400 g or more, and pencil hardness of 2H or more, thereby exhibiting suitable properties for a polarizing plate for a liquid crystal display.

The invention claimed is:

1. A polarizer protecting film, comprising a substrate and a photocurable resin layer provided on at least one face of the substrate, wherein the photocurable resin layer comprises a cured product of a photocurable binder and a dye, and wherein a maximum absorption wavelength is 520 nm to 540 nm and a maximum excitation wavelength is 540 nm to 600 nm, or a maximum absorption wavelength is 610 nm to 660 nm and a maximum excitation wavelength is 640 nm to 680 nm.

2. The polarizer protecting film of claim 1, wherein average light transmittance at a wavelength of 520 nm to 540 nm or 610 nm to 660 nm is less than 85%.

3. The polarizer protecting film of claim 1, wherein average light transmittance at a wavelength of 400 nm to 500 nm is 90% or more.

4. The polarizer protecting film of claim 1, wherein a pencil hardness under a load of 500 g is HB or higher.

5. The polarizer protecting film of claim 1, wherein the film does not have any scratches after moving the same 10 times back and forth in a friction tester with #0 steel wool under a load of 200 g.

6. The polarizer protecting film of claim 1, wherein the substrate comprises at least one selected from the group consisting of polyethylene terephthalate (PET), ethylene vinyl acetate (EVA), a cyclic olefin polymer (COP), a cyclic olefin copolymer (COC), polyacrylate (PAC), polycarbonate (PC), polyethylene (PE), polymethylmethacrylate (PMMA), polyetheretherketone (PEEK), polyethylene naphthalate (PEN), polyetherimide (PEI), polyimide (PI), methyl methacrylate (MMA), fluorine resin, and triacetylcellulose (TAC).

7. The polarizer protecting film of claim 1, wherein a relative luminance value measured by the following Formula 1 is 1.5 or more:

$$\text{A relative luminance} = B/A: \qquad \text{[Formula 1]}$$

wherein, in Formula 1,

A is a luminance value measured when a 535 nm or 635 nm laser is irradiated in 60° from a normal direction, after the polarizer protecting film not containing the dye is placed on a backlight side, and B is a luminance value measured when a 535 nm or 635 nm laser is irradiated in 60° from a normal direction, after the polarizer protecting film containing the dye is placed on a backlight side.

8. A polarizing plate, comprising:

a polarizer; and the polarizer protecting film of claim 1 provided on at least one face of the polarizer.

9. A liquid crystal display comprising the polarizing plate of claim 8.

10. A coating composition for a polarizer protecting film, comprising:

a binder containing a photocurable functional group, a dye comprising at least one selected from the group consisting of a compound having a maximum absorption wavelength of 520 nm to 540 nm and a maximum excitation wavelength of 540 nm to 600 nm, and a compound having a maximum absorption wavelength of 610 nm to 660 nm and a maximum excitation wavelength of 640 nm to 680 nm;

a photopolymerization initiator; and a solvent.

11. The coating composition for a polarizer protecting film of claim 10, wherein the binder containing a photocurable functional group comprises at least one selected from the group consisting of a polyfunctional acrylate-based monomer, a polyfunctional acrylate-based oligomer, and a polyfunctional acrylate-based elastic polymer.

12. The coating composition for a polarizer protecting film of claim 11, wherein the polyfunctional acrylate-based monomer comprises at least one selected from the group consisting of hexanediol diacrylate (HDDA), tripropylene glycol diacrylate (TPGDA), ethylene glycol diacrylate (EGDA), trimethylolpropane triacrylate (TMPTA), tri methylolpropaneethoxy triacrylate (TMPEOTA), glycerin propoxylated triacrylate (GPTA), pentaerythritol tri(tetra)acrylate (PETA), and dipentaerythritol hexaacrylate (DPHA).

13. The coating composition for a polarizer protecting film of claim 10, wherein the composition comprises 0.1 to 5 parts by weight of the dye, 0.1 to 10 parts by weight of the photopolymerization initiator, and 50 to 200 parts by weight of the solvent, based on 100 parts by weight of the binder containing the photocurable functional group.

14. The coating composition for a polarizer protecting film of claim 10, further comprising an organic fine particle or an inorganic fine particle.

* * * * *